(No Model.)
T. D. BOTTOME.
SECONDARY BATTERY.
No. 408,287. Patented Aug. 6, 1889.
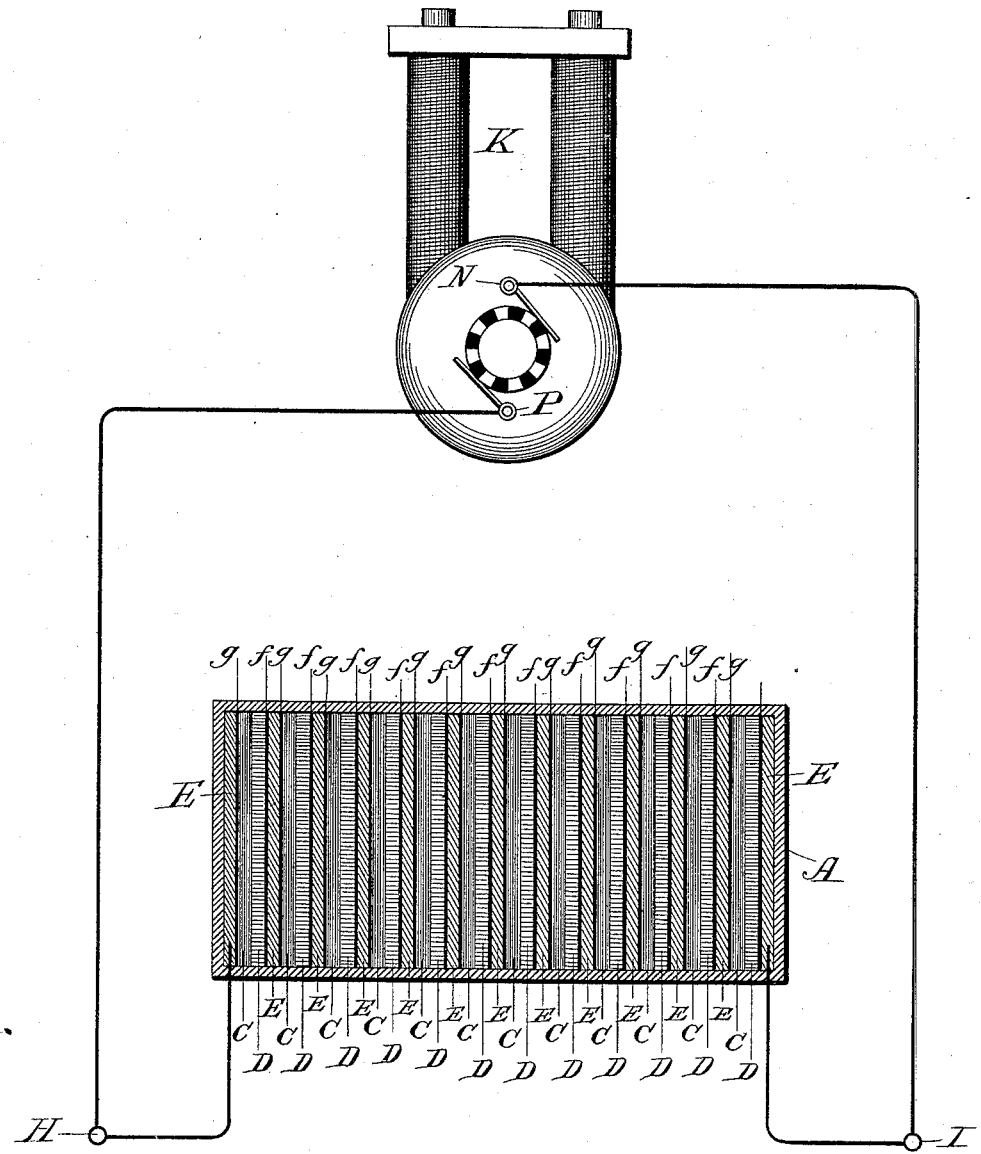
Witnesses:
J. W. Hibbard
A. Qualls
Inventor:
Turner D. Bottome

UNITED STATES PATENT OFFICE.

TURNER D. BOTTOME, OF NEW YORK, ASSIGNOR TO JOHN B. TIBBITS, OF HOOSICK, NEW YORK.

SECONDARY BATTERY.

SPECIFICATION forming part of Letters Patent No. 408,287, dated August 6, 1889.

Application filed May 28, 1889. Serial No. 312,477. (No model.)

*To all whom it may concern:*

Be it known that I, TURNER D. BOTTOME, a citizen of the United States, and a resident of New York, in the county of New York and State of New York, have invented certain new and useful Improvements in Storage-Piles, of which the following is a specification.

This invention relates to an improved method of constructing storage-piles and to the improved pile produced thereby.

Briefly, it consists of a vessel in which are placed alternate layers of a thick spongy paste of lead crystals, a paste of spongy glue, and a metallic plate coated with palladium on its negative side and coated with platinum or carbon on its positive side.

Hitherto storage-batteries have been made which consisted, essentially, of two plates supporting lead oxide and placed in an electrolyte of dilute sulphuric acid. On passing a current through the battery so formed the positive plate absorbed oxygen, while the negative plate lost oxygen, and the hydrogen liberated during electrolysis was partially dissolved in the electrolyte, the rest escaping.

The object of my invention is to condense the hydrogen liberated during electrolysis to form hydrogenium, which is a conductor of electricity and of a metallic nature; also, to dispense with the electrolytic liquid and the necessarily heavy leaden grids or active-material-supporting plates, substituting therefor a paste of spongy insoluble glue, rendered a good conductor by the addition of a suitable chemical reagent, the spongy paste serving a double purpose, being both a support for the lead and an electrolyte. I have found that palladium has the power, in a striking degree, of condensing hydrogen, forming an alloy therewith of palladium and hydrogenium. Although this reaction is known to the chemist as a scientific experiment, I am not aware that it has been before used in constructing a storage-pile.

To carry my invention into effect reference may be had to the accompanying drawings, which form a part of this specification.

A shows a storage-pile, consisting of a box or trough made of suitable non-conducting material.

C and D are layers, respectively, of a lead paste and a paste of spongy glue.

E is a plate of metal, preferably thin sheet lead or zinc, coated by electrolysis or mechanically on one side with palladium $f$ (preferably in a rough or spongy state) and similarly coated on the reverse side with platinum or carbon $g$.

H is the positive and I the negative terminal of the pile A.

K shows a dynamo having terminals P and N connecting with H and I.

The paste C consists of a quantity of the mass D mixed with the largest proportion of lead crystals, so as to yield a consistent mass. The lead crystals are made, preferably, by the electrolysis of lead sodium tartrate. The paste D is made from glue dissolved in hot water to a thick liquid, and rendered insoluble by the addition of about five per cent. aluminium sulphate and conductive by the addition of five or ten per cent. nitric acid or analogous chemical reagent of good electrical conductivity. The masses C and D and the plates E are placed in regular order until the box B is filled. C always being in contact with $g$ E, and the paste D always between C and $f$ E, C, D, and E form one element having an electro-motive force of about 2 to 2.5 volts; hence by increasing the number of layers of C, D, and E in a single box it is easy to obtain a pile giving one hundred volts or more in a single cell having only the usual two terminals, no extra electrical connections being required, effectually eliminating multiplicity of binding-screws, connectors, and soldered joints.

By increasing the area of the masses C D and plates E the electrical resistance is decreased and a larger volume of current in ampères can be had. By reducing the thickness of the mass C D the resistance is also reduced, but renders the capacity of charge less.

In order to "charge" the pile, a current from a dynamo G is passed through the circuit shown, P H I N, whereby when P is positive, the $f$ side of the plates E becomes negative and the $g$ side of E positive, resulting in the lead crystals contained in C to form lead peroxide getting its oxygen from D, while the equivalent of hydrogen liberated is deposited on $f$ E and is condensed to hydrogenium by virtue of the power of palladium to form an alloy with hydrogen. As lead peroxide is very electro-negative and hydrogenium electro-positive, a voltaic couple is formed whose electro-chemical affinity is very great. Therefore an electro-motive force is set up when a circuit is completed through the pile. On discharging the pile the reverse action takes place.

The plates E serve to collect the current and keep it in a uniform direction, and also to provide a suitable support for the palladium. Palladium is a very expensive metal at present; but the quantity required in a cell or pile is very small, because the metal will condense over nine hundred times its bulk of hydrogen, forming an alloy of metallic luster, conducting electricity, and being magnetic. From the small quantity of palladium required its use is not barred by its expense.

I do not limit myself specifically to palladium, as sodium and potassium also have the power of alloying with hydrogenium; but I prefer palladium because it is less oxidizable than sodium or potassium.

The advantages I am enabled to gain over the ordinary storage-battery are, among others, a decrease in bulk and weight for an equal output of electrical energy, entire freedom from damage from too rapid charge or discharge or from transportation of the piles, there being no tender connections to break or grids to disintegrate or become displaced, therefore being especially useful for rough handling, electric-traction work, isolated lighting power, and all purposes where bulk and weight are factors.

Having described my invention, what I claim as new and original is as follows:

1. A storage-pile consisting of a vessel composed of non-conducting material, wherein are placed alternate layers of a paste containing a large proportion of lead crystals, a paste of conductive non-soluble glue, and a metallic plate coated on one side with palladium and on the other with platinum or carbon, substantially as described.

2. A storage-pile consisting, when charged, of alternate layers of a mass of lead peroxide, an insoluble mass of glue, and an alloy of palladium and hydrogenium supported by a metallic plate of lead or zinc coated with platinum or carbon on its reverse side, substantially as herein described.

3. A storage-pile consisting in a number of battery elements arranged in series by simple contact, and composed, essentially, each of a positive paste containing lead or a lead compound and a negative paste not containing lead, but in contact with a body that is a good absorbent of hydrogen and forming an alloy therewith in the form of hydrogenium.

4. A storage-pile consisting in elements composed, essentially, of glue, nitric acid, and aluminium sulphate in varying proportions, one portion of such mass rendered positive by the addition of a quantity of lead crystals to form a heavy good conducting mass, substantially as described, and for the purpose herein specified.

Signed at New York, in the county of New York and State of New York, this 25th day of April, A. D. 1889.

TURNER D. BOTTOME.

Witnesses:
EMIL REINER,
LOUIS H. ZOCHER.